K. M. McIVER.
FASTENING DEVICE.
APPLICATION FILED NOV. 26, 1915.
1,198,941.
Patented Sept. 19, 1916.
2 SHEETS—SHEET 1.
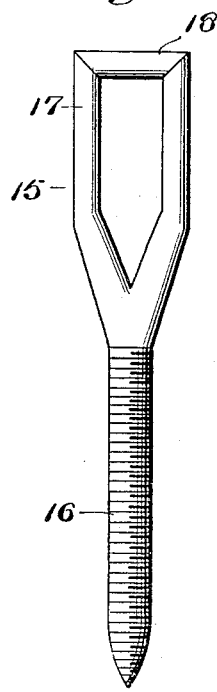
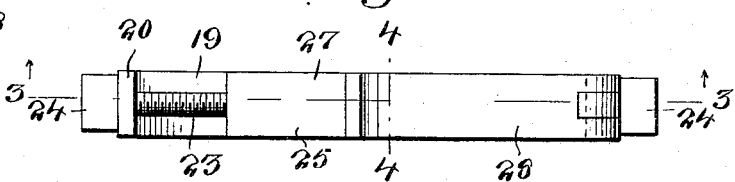
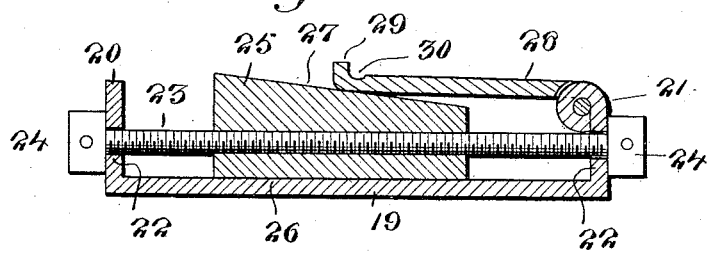
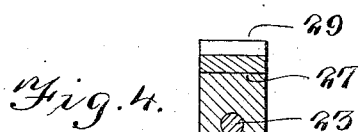
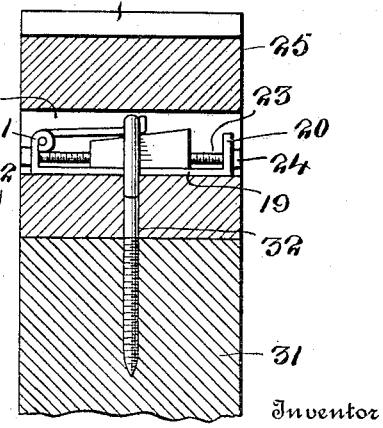
Inventor
K. M. McIver
By Victor J. Evans
Attorney K. M. McIVER.
FASTENING DEVICE.
APPLICATION FILED NOV. 26, 1915.

1,198,941.

Patented Sept. 19, 1916.
2 SHEETS—SHEET 2.

Inventor
K. M. McIver

Witnesses
By Victor J. Evans
Attorney

UNITED STATES PATENT OFFICE.

KENNETH M. McIVER, OF WARSAW, INDIANA, ASSIGNOR OF ONE-HALF TO WILLIAM J. BUSKIRK, OF PAOLI, INDIANA.

FASTENING DEVICE.

1,198,941.  Specification of Letters Patent.  Patented Sept. 19, 1916.

Application filed November 26, 1915. Serial No. 63,589.

*To all whom it may concern:*

Be it known that I, KENNETH M. McIVER, a citizen of the United States, residing at Warsaw, in the county of Kosciusko and State of Indiana, have invented new and useful Improvements in Fastening Devices, of which the following is a specification.

This invention relates to split pulleys, and it has for its object to produce a simple and efficient fastening device whereby the parts of the split pulley may be easily and conveniently assembled and drawn tightly together on a line shaft or the like.

A further object of the invention is to produce a connecting device including an eye bolt permanently connected with one member and a wedge device adapted to be detachably connected with another member that is to be assembled with the first member, said wedge device being capable of being readily manipulated to engage the eye bolt, thus drawing the two members tightly together.

A further object of the invention is to simplify and improve the construction and operation of the wedge device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 7:
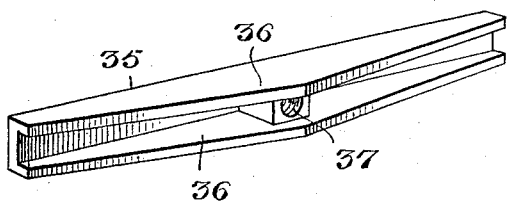
Figure 8:
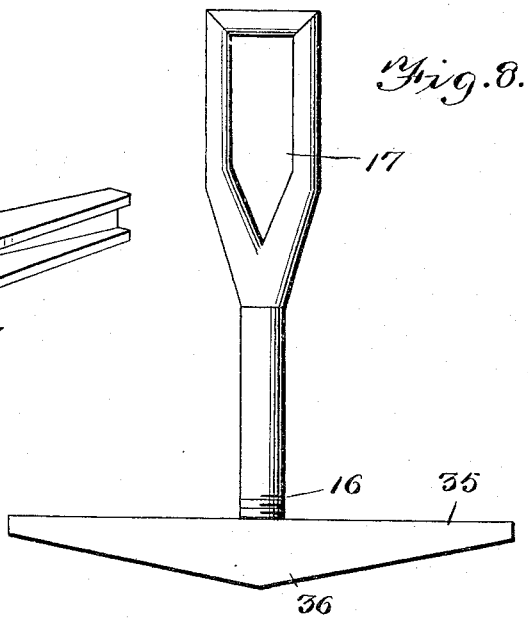
Figure 9:
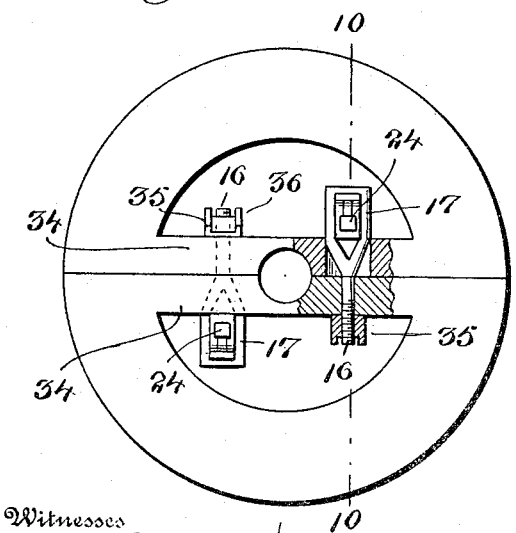
Figure 10:
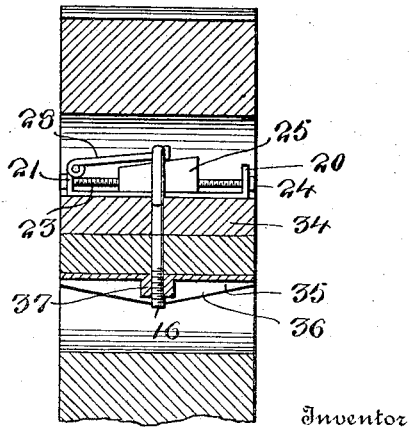

In the drawings,—Figure 1 is a side view of an eye bolt used in connection with the invention. Fig. 2 is a plan view of the wedge device. Fig. 3 is a sectional view of the wedge device taken on the line 3—3 in Fig. 2. Fig. 4 is a sectional view of the wedge device taken on the line 4—4 in Fig. 2. Fig. 5 is a side view of a solid split pulley equipped with the improved connecting device, parts having been broken away to more clearly illustrate the construction. Fig. 6 is a sectional view taken on the line 6—6 in Fig. 5. Fig. 7 is a perspective detail view of an anchoring device used in connection with the eye bolt when the latter is applied to a split pulley equipped with cross pieces or spokes. Fig. 8 is a side view of an eye bolt to which the anchoring device shown in Fig. 7 has been applied. Fig. 9 is a side view of a split pulley having cross bars or spokes and equipped with the improved connecting device. Fig. 10 is a sectional view taken on the line 10—10 in Fig. 9.

Corresponding parts in the several figures are denoted by like characters of reference.

The eye bolt 15 which is a part of the improved connecting device includes a threaded stem 16 and an eye 17 which is of elongated form, as shown, said eye having a straight end wall 18.

The wedge device includes a bar 19 of suitable width to engage the eye 17, said bar having upturned end portions forming lugs or flanges 20, 21 which are provided with apertures 22 for the passage of a screw threaded stem or bolt 23 which is free to rotate in said apertures, said stem or bolt being provided at both ends with non-circular heads 24 which are securely connected therewith, and whereby the said stem or bolt may be rotated about its axis. The stem or bolt 23 carries a wedge member 25 having a longitudinal threaded bore engaging the said bolt by the rotation of which the wedge member may be moved lengthwise of the bar 19 with which one face of the wedge member which for convenience will be called the inner face 26 contacts, as shown. The outer inclined face 27 of the wedge member engages a tongue 28 which is hingedly connected with the lug 21, said tongue having a terminal flange 29, and adjacent to said flange a transverse groove 30. The parts are preferably so proportioned that the transverse groove will be positioned about midway between the flanges 20, 21. It is also preferred that the small end of the wedge member 25 be pointed in the direction of the lug 21 with which the tongue 28 is connected, as clearly seen in Fig. 3 of the drawings.

In applying the connecting device to a split pulley of the solid variety, as seen in Figs. 5 and 6, the stems 16 of the two eye bolts are preferably threaded into the two halves 31 of the pulley at opposite sides of the center and preferably about midway between the center and the periphery, the eyes of the respective bolts being permitted to extend from the meeting faces of the members 31. Said members 31 are each provided with a recess 32 for the reception of the eye projecting from the face of the mating member, each recess 32 being intersected by a transverse slot 33 into which, after the members 31 have been juxtaposed, one of the wedge devices is inserted, said wedge device passing through the eye of the bolt. The wedge devices are so positioned that the end wall 18 of the eye of each bolt will be engaged by the transverse recess of the tongue 28 of one of the wedge devices, the flange 29 constituting a stop member which will enable the operator to ascertain when the wedge device has been properly positioned. A wrench may now be applied to one of the hubs 21 of the bolt 23 which when rotated in the proper direction will cause the wedge 25 to force the tongue 28 outward from the bar 19, which latter abuts on an end wall of the slot 33, the resilient stress being effective in drawing the parts or members 31 tightly together. It is obvious that the wedge devices as well as the eye bolts are to be properly proportioned with respect to the dimensions of the pulleys in connection with which they are to be used.

When the device is to be used in connection with split pulleys having cross bars or spokes, as shown at 34 in Figs. 9 and 10, the threaded stems 16 of the eye bolts are engaged with anchoring devices, each consisting of a bar 35 bridging the spokes 34, said bar having upturned flanges 36 and a threaded aperture 37 for engagement with the screw threaded stem, the upturned flanges being for the purpose of reinforcing the construction. In other respects the construction is as previously described, it being understood that the anchoring devices and the wedge devices are disposed in contact with the inner faces of the spokes of the respective pulley members.

As will be seen from the foregoing description, taken in connection with the drawings hereto annexed, I have produced a connecting device of very simple and effective construction which may obviously be utilized not only in connection with split pulleys, but for the purpose of connecting together any objects that are to be tightly assembled and drawn or forced into intimate contact with each other. By having the tongue 28 hingedly connected with the bar 19 of the wedge device, said tongue will always be maintained in proper position, and the device may be adjusted and operated with much greater facility, accuracy and efficiency than if a loose element were employed to be directly engaged by the wedge 25.

Having thus described the invention, what is claimed as new, is:—

1. An object, a loop extending therefrom, a second object having a recess for the reception of the loop and a slot intersecting said recess, and a tightening device accommodated in the slot and extending through the loop, said tightening device embodying a supporting bar, a wedge, means for guiding and actuating said wedge, and a tongue hingedly connected with the supporting bar and actuated by the wedge, said tongue being adapted for engagement with the end wall of the loop.

2. An object having a loop extending therefrom, a second object having a recess for the reception of the loop and a slot intersecting said recess, and a tightening device accommodated in the slot and extending through the loop, said tightening device embodying a wedge, a supporting bar, means for guiding and actuating said wedge, and a tongue hingedly connected with the supporting bar and actuated by the wedge, said tongue having a flange constituting a stop member and a recess adjacent to said flange for engagement with the end wall of the loop.

3. In a device of the class described, a loop, and a tightening device for engagement therewith, said tightening device comprising a guide bar having lugs at the ends thereof, a screw swiveled in said lugs and having heads whereby it may be rotated, a wedge having threaded engagement with the screw, and a tongue hingedly connected with one of the lugs with its free end in engagement with the wedge.

4. In a device of the class described, a loop, and a tightening device for engagement therewith, said tightening device comprising a guide bar having lugs at the ends thereof, a screw swiveled in said lugs and having heads whereby it may be rotated, a wedge having threaded engagement with the screw, and a tongue hingedly connected with one of the lugs with its free end in engagement with the wedge, said tongue having an upturned end portion forming a stop member and a transverse groove adjacent to said stop member.

5. An object having a loop anchored thereto and projecting therefrom, a second object having a recess for the reception of said loop and a slot intersecting said recess, and a tightening device engaging the slot and extending through the loop, said device comprising a bar having terminal lugs, a screw swiveled in the lugs and having terminal heads accessible through the ends of the slot, a wedge guided on the screw in engagement with the bar, and a tongue hingedly connected with one of the lugs and having its free end in engagement with and actuated by the wedge, said tongue having a recess to receive the end portion of the loop.

In testimony whereof I affix my signature in presence of two witnesses.

KENNETH M. McIVER.

Witnesses:
CHARLES W. GOTH,
LORENZO O. MILLER.

Copies of this patent may be obtained for five cents each, by addressing the "Commissioner of Patents, Washington, D. C."